March 1, 1927.
E. LARSSON
1,619,675
CHAIN COUPLING FOR LOGS
Filed Aug. 16, 1926
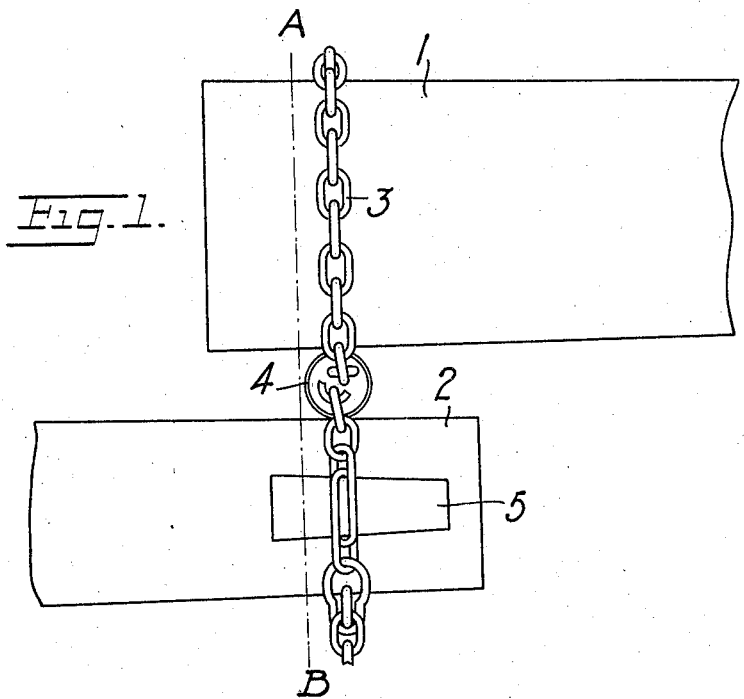
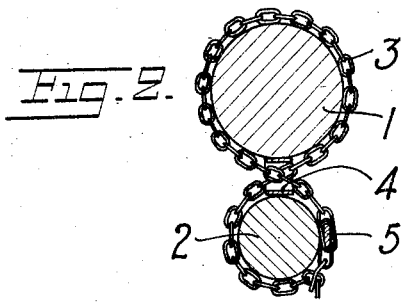
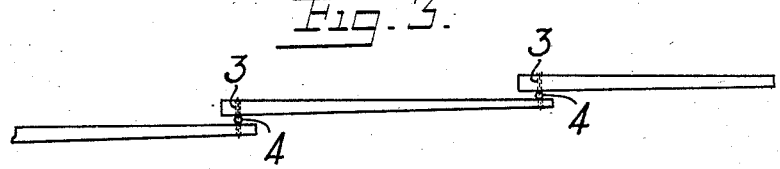
Inventor
Edward Larsson,
By Hemworth
Atty.

Patented Mar. 1, 1927.

1,619,675

UNITED STATES PATENT OFFICE.

EDWARD LARSSON, OF STOCKHOLM, SWEDEN.

CHAIN COUPLING FOR LOGS.

Application filed August 16, 1926, Serial No. 129,597, and in Sweden September 5, 1925.

It is well known to provide rows of logs having their ends connected to each other by chain couplings in water courses used for timber floating at such places where the timber has a tendency to strike the shores in order to prevent such striking. Chain couplings hitherto used for this purpose suffer from the disadvantage that they do not allow adjacent logs to form with one another any desired angle which is often desirable for instance at such places where the row of logs has to follow shores forming curves of various diameters.

The object of the invention is to provide a chain coupling of such construction that it allows the logs connected to each other by the same to form between them any desired angle approximately as easily as if they were connected to each other by means of a hinge.

The invention consists in this that a chain is laid around the overlapping ends of two logs in the shape of an 8, the portions of the chain crossing each other being passed through a short tube piece provided between the logs, the chain having means by which it can be tightened on the logs.

In the accompanying drawing I have shown one embodiment of my invention. Fig. 1 shows a plan view of the ends of two logs connected to each other by means of my improved chain coupling. Fig. 2 is a section at a smaller scale on line A—B of Fig. 1, and Fig. 3 shows diagrammatically a row of logs.

Around the ends of the logs 1 and 2 overlapping each other a chain 3 is placed in the shape of an 8. Between the logs is placed a short tube piece 4 through which the portions of the chain crossing each other are passed. The chain is first placed around the one log whereupon the ends of the chain are inserted from opposite sides through the tube piece 4 and thereupon placed around the other log and secured to each other by a suitable tightening device. In the construction shown in the drawing this device consists of a wedge 5 which is inserted through two adjacent elongated chain links, but obviously it may be of any other construction. The cross section of the tube piece 4 need not be circular but may be triangular, square and so on.

As will be easily understood, two logs connected to each other by means of the present coupling will be capable of swinging relatively to one another to a certain extent without causing the coupling to loosen or burst and a row of logs therefore easily can be placed in such a manner that it follows the shore contours.

Having now described my invention what I claim is:

A chain coupling for logs comprising a chain placed around the overlapping ends of the logs in the shape of an 8, a short tube piece provided between the logs, the portions of the chain crossing each other being passed through said tube piece, and means for tightening the chain on the logs, substantially as and for the purpose set forth.

In testimony whereof I have hereunto signed my name.

EDWARD LARSSON.